United States Patent [19]
Bienert

[11] 3,949,624
[45] Apr. 13, 1976

[54] LIFTING LINKAGE FOR ROOF VENT PANELS OF AUTOMOBILES

[75] Inventor: Horst Bienert, Gauting, Germany

[73] Assignee: Webasto-Werk W. Baier KG, Stockdorf, Munich, Germany

[22] Filed: Aug. 6, 1974

[21] Appl. No.: 495,244

[30] Foreign Application Priority Data
Aug. 16, 1973 Germany............................ 2341203

[52] U.S. Cl. ............................... 74/520; 296/137 B
[51] Int. Cl.² .......................................... G05G 1/04
[58] Field of Search.......... 74/519, 480 R, 491, 520; 296/137 R, 137 A–137 H; 16/128.1, 148; 292/DIG. 5, DIG. 9; 52/45

[56] References Cited
UNITED STATES PATENTS
1,672,559   6/1928   Doble............................ 296/137 B Primary Examiner—Samuel Scott
Assistant Examiner—Frank H. McKenzie, Jr.
Attorney, Agent, or Firm—Joseph A. Geiger

[57] ABSTRACT

A lifting linkage for an upwardly pivotable vent panel in the roof structure of an automobile, where an upper and lower knee lever form a knee linkage which is detachable from the vent panel and adjustable in relation to the actuating rod by means of a high-friction slip fit. In the collapsed position the knee levers engage each other to prevent rattling.

19 Claims, 5 Drawing Figures

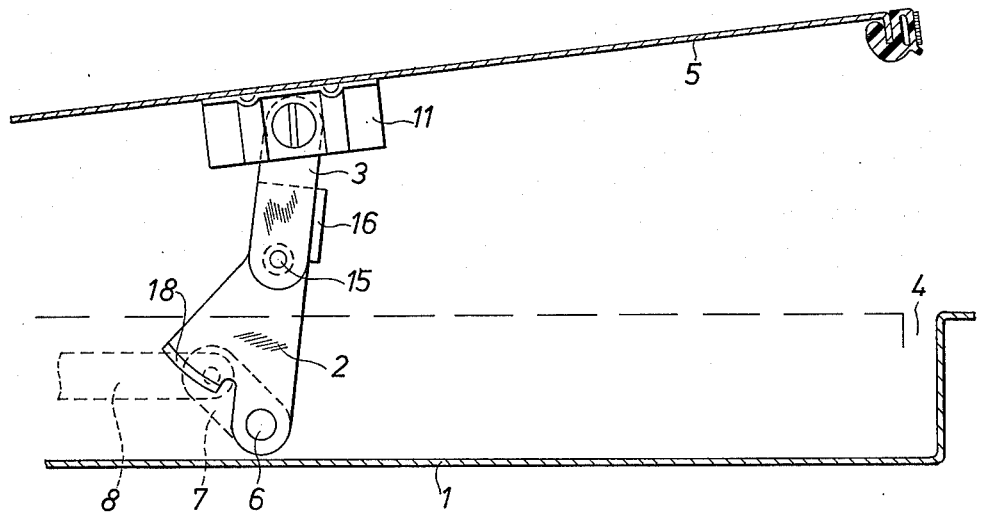
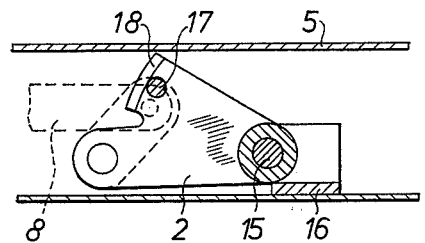
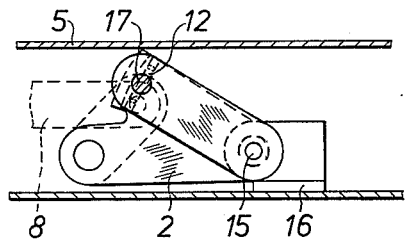
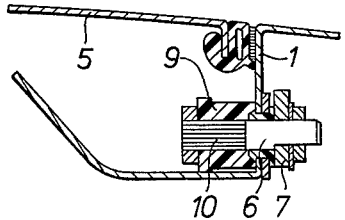
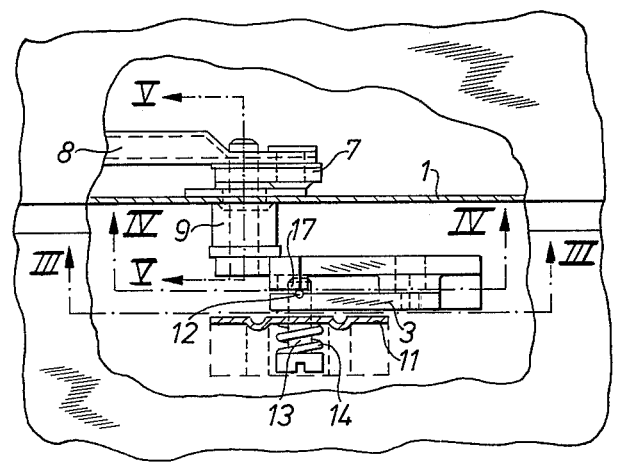

3,949,624

LIFTING LINKAGE FOR ROOF VENT PANELS OF AUTOMOBILES

BACKGROUND OF THE INVENTION

1. Field of the Invention

The present invention relates to linkage mechanisms for openable automobile roof panels, and in particular to lifting linkages for upwardly pivotable vent panels arranged in the roof structure of automobiles.

2. Description of the Prior Art

Various lifting linkages for upwardly pivotable roof vent panels are known from the prior art. In most cases, they consist of spring-loaded levers cooperating with telescoping lifting legs.

Another prior art mode of opening a roof vent panel suggests a downwardly slanting pocket in the area of the forward portion of the panel, into which the vent panel can be moved under a pivoting motion.

SUMMARY OF THE INVENTION

Underlying the present invention is the objective of devising an improved device for the opening and closing of roof vent panels, which, like the last-mentioned prior art device, is operable from the forward portion of the automobile roof, but which, in comparison to the known solution, is considerably simplified in structure and therefore much more economical in production and assembly.

In order to attain this objective, the present invention suggests a lIfting linkage for an upwardly pivotable roof panel comprising on each longitudinal side of the panel an upper and lower knee lever connected together by a knee joint, the upper lever being attached to the vent panel and the lower lever being pivoted at the roof frame and connected to an actuating lever and actuating rod, by means of which the knee linkage can be stretched and collapsed, thereby opening and closing the vent panel.

In a preferred embodiment, the invention further suggests a high-friction slip connection arranged between the actuating lever and the lower knee lever so as to permit convenient adjustment of the angular motion range of the latter, without the need for any tools or removal of any parts.

A still further advantage of the preferred embodiment lies in a convenient quick-release connection between the upper knee lever and the vent panel, whereby it becomes possible to disconnect the vent panel from the lifting linkage for complete removal of the former from the roof, if desired.

A still further advantageous feature suggested by the invention relates to an arrangement of the two knee levers, whereby, in the last portion of their collapsing motion, a frictional engagement is created between the two levers so as to preclude any vibration-induced rattling of the mechanism or of the closed vent panel.

Lastly, the knee linkage preferably includes abutment means preventing the linkage from moving beyond its stretched position, when the vent panel is fully opened.

The two units of the lifting linkage may be actuated by a common actuating mechanism, such as a centrally located, rotatable actuating handle and oppositely connected transverse connecting rods engaging the actuating levers of the invention via bell cranks, for example.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows:

FIG. 1 shows in a longitudinal elevational cross section the rear portion of an upwardly pivoted vent panel with one unit of the stretched lifting mechanism embodying the invention;

FIG. 2 shows a plan view of the lifting mechanism of FIG. 1 in its collapsed position, the vent panel being removed;

FIG. 3 is a cross section along line III—III of FIG. 2;

FIG. 4 is a cross section along line IV—IV of FIG. 2; and

FIG. 5 is a transverse cross section along line V—V of FIG. 2.

DESCRIPTION OF THE PREFERRED EMBODIMENT

As can be seen in the figures of the drawing, the preferred embodiment of the invention consists of two units of a lifting linkage — only one unit being shown — designed for the opening and closing of an upwardly pivotable roof vent panel 5 in relation to an opening 4 in the stationary structure of an automobile. Surrounding the roof opening 4 is a downwardly recessed angular roof frame 1 which supports both units of the lifting linkage.

Each unit of the lifting linkage consists of a lower knee lever 2 and an upper knee lever 3, joined together at a knee joint 15, the lower knee lever 2 being pivotably attached to the roof frame 1 by means of a pivot shaft 6, while the upper knee lever 3 carries on its far end the pivotable roof panel 5, being connected thereto by means of a pivot pin 13.

Also connected to the pivot shaft 6 of the lower knee lever 2 is an actuating lever 7 which, in turn, is engaged by an actuating rod 8. The two actuating rods 8 extend longitudinally alongside the vent panel to the forward portion of the stationary roof structure surrounding the opening 4. There, they may be connected to a suitable actuating mechanism which is not a part of this invention. An example of such a mechanism is disclosed in my co-pending application Ser. No. 488,965 filed July 16, 1974.

While the actuating lever 7 is fixedly connected to the pivot shaft 6 (FIG. 5), the lower knee lever 2 is connected to the same shaft by means of a high-friction slip fit, having a slip-on hub 9 engaging a serrated portion of the pivot pin 6. As a result of this arrangement, it is possible to adjust the angular relationship between the actuating lever 7 and the lower knee lever 2 by forcibly moving one of the levers and retaining the other, thereby quickly and conveniently adjusting the opened and closed positions of the roof panel 5 in relation to the movement of the actuating rods 8.

The upper knee lever 3 is pivotably connected to a bracket 11 which, in turn, is attached to the roof panel 5. The connection between lever 3 and bracket 11 is constituted by a quick-release pivot pin 13 reaching through both parts and having a cross pin 12 near the extremity of its shaft, while a spring 14 between its head and bracket 11 maintains the pivot pin 13 under an axial preload. Upon removal of the cross pin 12, the pivot pin 13 can be retracted so that the lifting linkage is separated from the vent panel 5, allowing complete removal of the latter.

Alternatively, the upper knee lever 3 may have appropriate slots for the passage of the cross pin 12, so that the pivot pin 13 may be removed in the manner of a bayonet lock, the pivot pin 13 having a suitable screw driver slot for this purpose.

The lower knee lever 2 also carries an abutment ear 16 reaching beyond the knee joint 15, the ear 16 engaging the upper knee lever 3 in the fully stretched linkage position, so that the latter cannot move beyond the stretched position.

In the collapsed position, the knee linkage further includes friction means between the two levers, which friction means prevents movement of the closed vent panel 5 and of the linkage components under vibration. The friction means itself is preferable provided in the form of a cam-shaped braking surface 18 arranged on the lower knee lever 2, at a distance from the knee joint 15 at which it engages the shaft end 17 of the pivot pin 13, which thereby acts as a braking member. The curved braking surface 18 on lever 2 is preferably so arranged that the braking member 17 moves at an acute angle against it, so as to create a slight wedging action between the collapsed knee levers. This wedging action positively prevents any rattling of the mechanism or of the vent panel 5.

It should be understood, of course, that the foregoing disclosure describes only a preferred embodiment of the invention and that it is intended to cover all changes and modifications of this example of the invention which fall within the scope of the appended claims.

I claim:

1. A linkage for lifting and lowering a vent panel in relation to an opening in the roof structure of an automobile, in which a downwardly recessed roof frame with a vertical frame wall portion surrounds at least a major portion of the roof opening, the linkage comprising in combination:

an upper knee lever pivotably attached at one end to the vent panel;

a lower knee lever pivotably attached at one end to the roof frame;

a knee joint between the two knee levers so as to define a knee linkage connection between their attachment points and the intermediate knee joint; and an actuating member operatively connected to the lower knee lever so as to move the linkage between a stretched position in which the vent panel is fully open, and a collapsed position in which the vent panel is closed against the roof opening.

2. A linkage as defined in claim 1, further comprising:

a pivot shaft extending through said vertical frame wall portion of the roof structure as part of said pivot attachment of the lower knee lever; and an actuating lever mounted on the pivot shaft and connected to the actuating member at a radial distance from said shaft; the actuating lever and the lower knee lever being connected together for joint rotation around the pivot shaft axis.

3. A linkage as defined in claim 2, further comprising means for angularly adjusting the rotational connection between the actuating lever and the lower knee lever.

4. A linkage as defined in claim 3, wherein:

one of the two levers which are rotatable around the pivot shaft axis is fixedly attached to the pivot shaft;

the pivot shaft is journalled in the vertical frame wall portion; and the other of the two levers is angularly adjustably attached to the pivot shaft, said attachment constituting the angular adjustment means.

5. A linkage as defined in claim 4, wherein the angular adjustment means includes a high-friction slip fit between the pivot shaft and said other lever.

6. A linkage as defined in claim 4, wherein:

the angular adjustment means includes a high-friction slip fit connecting the lower knee lever to that part of the pivot shaft which extends toward the roof opening and the actuating lever is fixedly attached to that other part of the pivot shaft which is located on the other side of the vertical frame wall portion.

7. A linkage as defined in claim 1, further comprising means for frictionally engaging the two knee levers in relation to one another in at least that portion of their motion range which includes the collapsed linkage position.

8. A linkage as defined in claim 7, wherein;

the frictional engagement means includes a braking surface defined by one of the two knee levers and a cooperating braking member defined by the other of the two knee levers; and the braking surface and braking member are arranged to engage one another in a wedging-type cam action, when the knee linkage approaches its collapsed position.

9. A linkage as defined in claim 7, wherein:

the frictional engagement means includes a braking surface defined by the lower knee lever and a cooperating braking member connected to the upper knee lever; and the braking member is a portion of a pivot pin constituting a part of the pivot attachment betweeen the upper knee lever and the vent panel.

10. A linkage as defined in claim 9, wherein the braking surface on the lower knee lever is part of an arcuate, axially upstanding cam section engaging a cylindrical shaft extension of the pivot pin, which latter thereby serves as the braking member.

11. A linkage as defined in claim 1, further comprising means for quickly releasing the pivot attachment between the upper knee lever and the vent panel.

12. A linkage as defined in claim 11, wherein:

the vent panel includes a bracket with a vertical wall portion;

the quick-release means is defined by a releasable pivot pin which also provides said pivot attachment between the upper knee lever and the vertical wall portion of the bracket by reaching through a bore in each of those two parts; and the pivot pin has a head on one end, thereof a shaft reaching through said bores, a compression spring surround the shaft, and a cross pin near the extremity of the shaft on the other end of the pivot pin.

13. A linkage as defined in claim 12, wherein the pivot pin is releasable by virtue of the cross pin being removable, when the spring on the pivot pin shaft is compressed.

14. A linkage as defined in claim 12, wherein:

the pivot pin is releasable through rotation in the manner of a bayonet lock, the compression spring being arranged under the pivot pin head; and the bore of one of the two parts linked together by the pivot pin has a shape which permits retraction of the pivot pin shaft when its cross pin is oriented in a particular angular orientation.

15. A linkage as defined in claim 1, further comprising means for abutting the upper and lower knee levers against each other in their stretched position.

16. A linkage as defined in claim 15, wherein the abutting means is defined by an abutment ear on one of the two knee levers engaging the other knee lever in the stretched linkage position, thereby preventing further motion around their knee joint beyond said stretched position.

17. A linkage as defined in claim 16, wherein the abutment ear is defined by an extension of the knee lever reaching beyond the knee joint in the direction of the upper knee lever, when the linkage is stretched.

18. A linkage as defined in claim 1, further comprising means for quickly releasing the knee joint connection between the upper and lower knee levers.

19. A linkage as defined in claim 18, wherein the quick-release means is defined by a pivot pin in the knee joint, the pivot pin being releasable in the manner of a bayonet lock.

* * * * *